(12) United States Patent
De Matteis

(10) Patent No.: US 8,261,646 B2
(45) Date of Patent: Sep. 11, 2012

(54) CLAMPING DEVICE FOR TRANSVERSAL CUTTING MACHINES OF LOGS OF PAPER

(75) Inventor: Alessandro De Matteis, Lucca (IT)

(73) Assignee: MTC-Macchine Trasformazione Carta S.R.L., Lucca (IT)

(*) Notice: Subject to any disclaimer, the term of this patent is extended or adjusted under 35 U.S.C. 154(b) by 150 days.

(21) Appl. No.: 11/074,935

(22) Filed: Mar. 9, 2005

(65) Prior Publication Data

US 2005/0217443 A1 Oct. 6, 2005

(30) Foreign Application Priority Data

Mar. 31, 2004 (EP) ..................................... 04425239

(51) Int. Cl.
*B26D 1/00* (2006.01)
*B26D 3/00* (2006.01)
*B26D 7/14* (2006.01)
*B26D 7/06* (2006.01)
*B26D 5/42* (2006.01)
*B26F 3/00* (2006.01)
*B65H 35/10* (2006.01)

(52) U.S. Cl. .................. 83/651; 83/17; 83/107; 83/113; 83/13; 83/383; 225/2; 225/96.5

(58) Field of Classification Search ............... 83/176, 83/107, 113, 118, 54, 17, 18, 490, 491, 383, 83/385, 386, 387; 225/2, 96.5
See application file for complete search history.

(56) References Cited

U.S. PATENT DOCUMENTS

| 3,213,731 | A | * | 10/1965 | Renard | 83/174 |
| 3,550,490 | A | * | 12/1970 | Hicks, J. T. | 82/87 |
| 3,978,747 | A | * | 9/1976 | Lyon | 83/18 |
| 4,370,140 | A | * | 1/1983 | Fegley et al. | 493/289 |
| 4,378,715 | A | * | 4/1983 | Kaiser et al. | 83/113 |
| 4,553,460 | A | * | 11/1985 | Stahl et al. | 83/113 |
| 4,567,795 | A | * | 2/1986 | Pool | 83/17 |
| 5,017,399 | A | * | 5/1991 | Montano et al. | 426/636 |
| 5,299,480 | A | * | 4/1994 | Harris et al. | 83/27 |
| 5,315,907 | A | * | 5/1994 | Biagiotti | 83/38 |

(Continued)

FOREIGN PATENT DOCUMENTS
AT 324876 11/1975
(Continued)

*Primary Examiner* — Ghassem Alie
*Assistant Examiner* — Bharat C Patel
(74) *Attorney, Agent, or Firm* — Dennison, Schultz & MacDonald

(57) ABSTRACT

Transversal cutting machine comprises feeding means (20) that supply a log of paper (15), for example hygienic paper, to a sawing station at which rolls or stacks (16) are cut off from the log (15) by a blade (25). During the cutting step the log (15) is held by a clamping device (1), divided in two parts (2, 3) arranged respectively upstream from and downstream of a slit (17) through which the blade (25) passes. In particular, the first part (2) and the second part (3) of clamping device (1) are movable relatively so that during the cut the log (15) is locally subject to traction at the same time of the blade (25) driven in the log. This way, during the cutting action of the blade (25) an opening (17) is created on the log (15) having a size at least the same as the thickness of blade (25) same. This makes easier the action of blade (25) since it reduces the friction produced between the blade (25) and the log (15). Moreover, the clamping device reduces the friction between the blade and the log thus reducing the wear caused by the cutting step.

14 Claims, 5 Drawing Sheets

U.S. PATENT DOCUMENTS

| | | | |
|---|---|---|---|
| 5,350,098 A | | 9/1994 | Oakley et al. |
| 5,453,070 A | * | 9/1995 | Moody .................... 493/288 |
| 5,472,126 A | * | 12/1995 | Stroup et al. ................ 225/2 |
| 5,522,292 A | * | 6/1996 | Biagiotti ..................... 83/38 |
| 5,647,259 A | * | 7/1997 | Biagiotti ................... 83/458 |
| 5,755,146 A | * | 5/1998 | Lumberg .................. 82/70.1 |
| 6,532,851 B2 | * | 3/2003 | Moss et al. ............... 83/466 |
| 6,718,853 B2 | * | 4/2004 | Butterworth ............... 82/91 |
| 2003/0180107 A1 | * | 9/2003 | Lutz ......................... 408/39 |
| 2003/0187540 A1 | * | 10/2003 | Urmson ..................... 700/167 |
| 2003/0200845 A1 | * | 10/2003 | Butterworth ............... 82/83 |
| 2003/0226432 A1 | * | 12/2003 | Majeski ...................... 83/13 |

FOREIGN PATENT DOCUMENTS

| | | |
|---|---|---|
| EP | 0 982 105 | 3/2000 |
| EP | 1 254748 | 11/2002 |
| GB | 1260025 A * | 11/1969 |
| GB | 1 260025 | 7/1972 |

\* cited by examiner

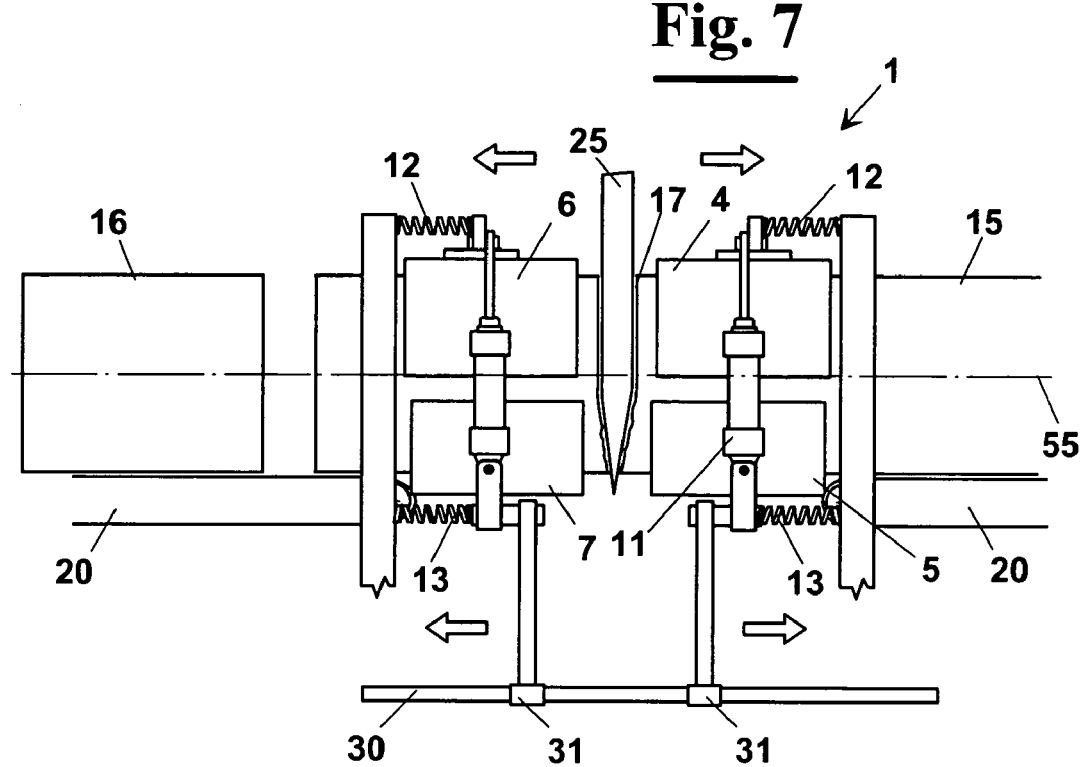
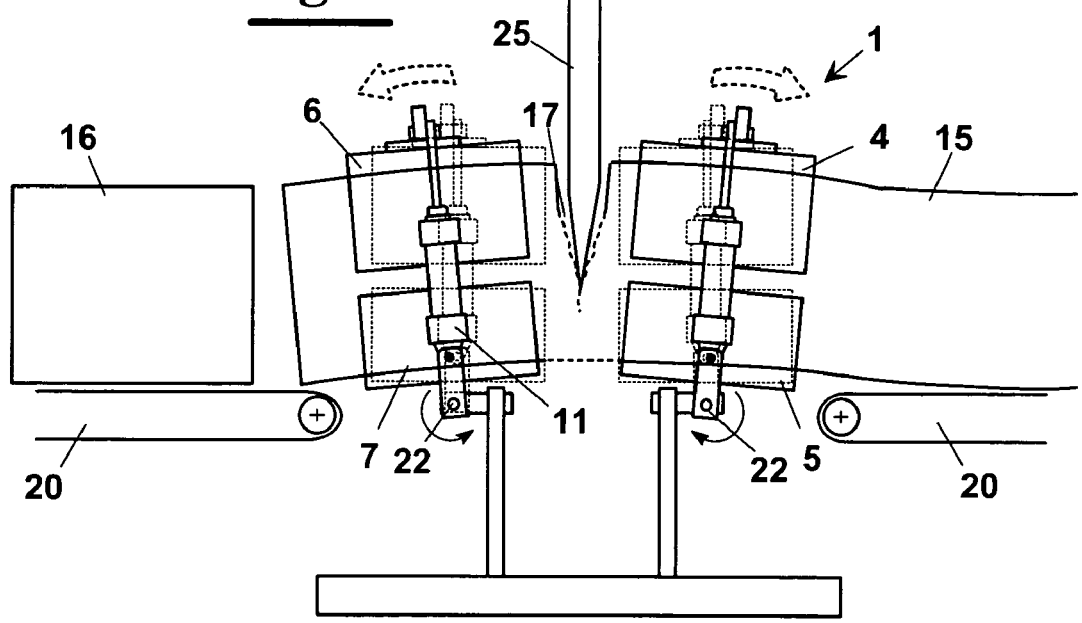

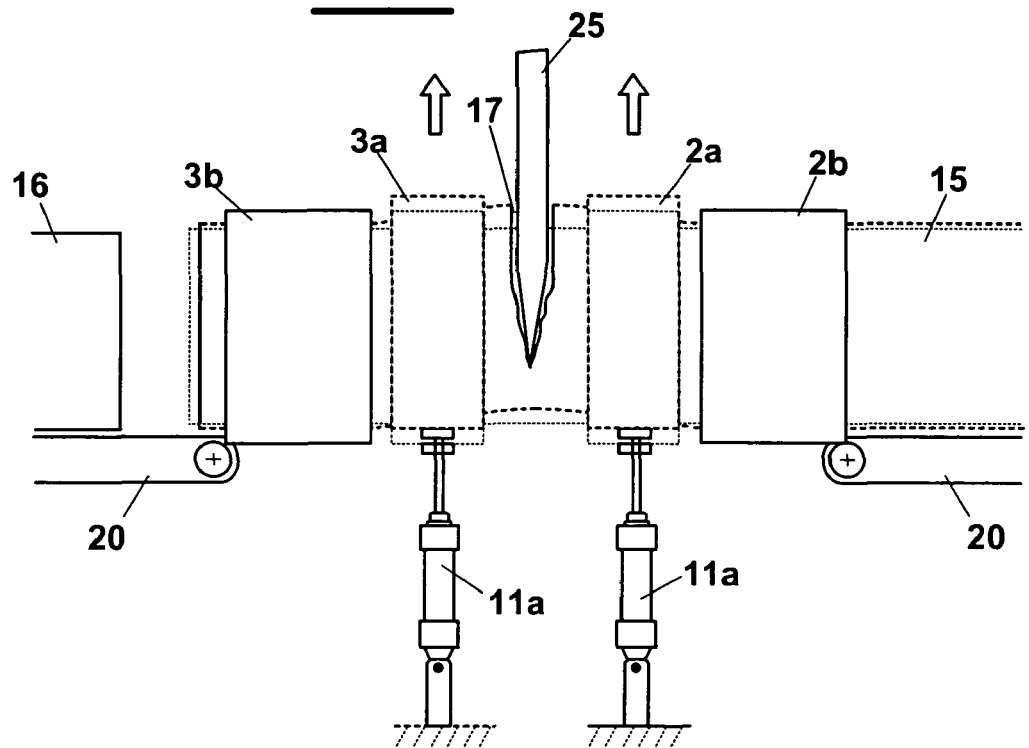
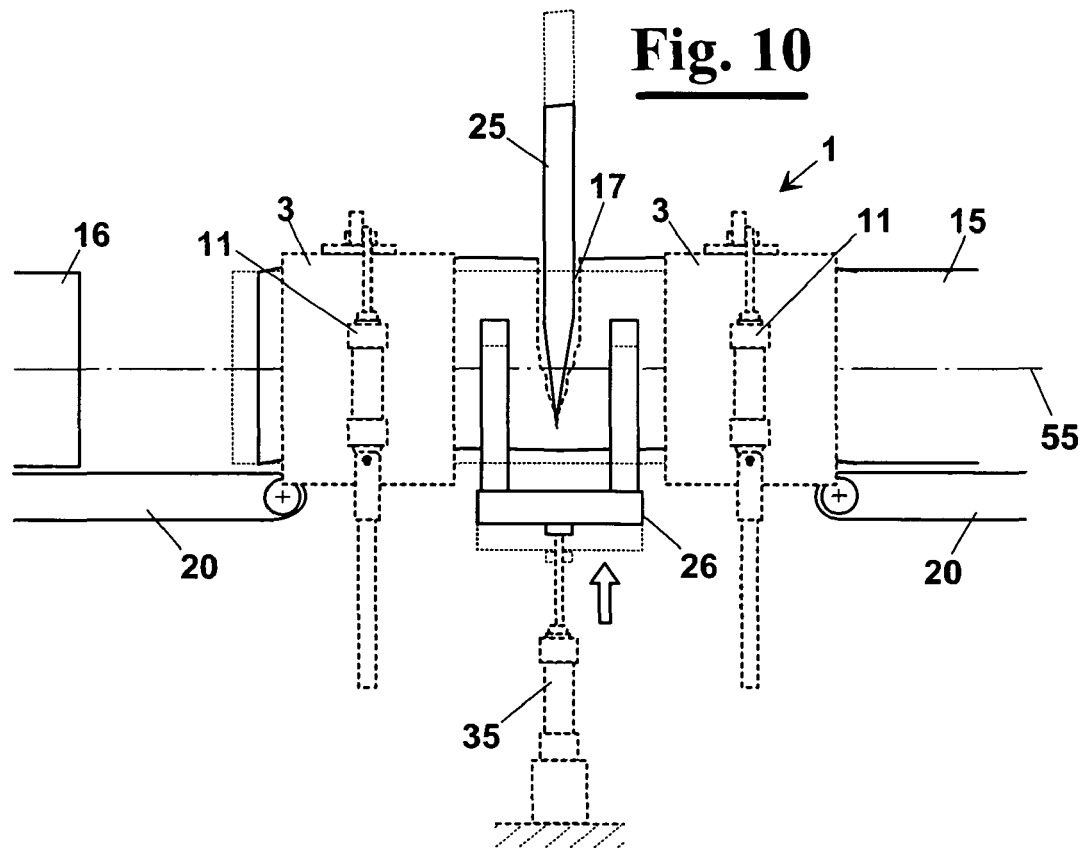

CLAMPING DEVICE FOR TRANSVERSAL CUTTING MACHINES OF LOGS OF PAPER

FIELD OF THE INVENTION

The present invention generally relates to paper converting machines and, more precisely, it relates to a transversal cutting machine of logs of paper and the like, for the production of rolls of toilet paper, general purpose towels, industrial rolls, stacks of napkins and the like.

In particular, the invention relates to a device for clamping the log during the cut off step of a saw.

DESCRIPTION OF THE PRIOR ART

Transversal cutting machines are known, for making small rolls or stacks of paper, for example rolls of toilet paper, general purpose towels, stacks of napkins and the like, that are supplied upstream with logs of paper.

In said machines one or more logs are normally loaded on a stepped pushing bench. Then, the end of the logs being cut is in turn held by means of clamps and a rocking saw is driven in succession into the paper thus cutting off the logs into rolls or stacks. More precisely, before that the saw is driven onto the logs, the latter are pushed forward axially for distances equal to the height of each roll or stack. Then, the logs are blocked only at the moment of the cut by means of a clamping device that allows, instead, their sliding during a pushing step.

The clamping device has normally an encircling shape so that the log does not collapse but at the same time the log cannot slide at the moment of the cut.

A transversal cutting machine should be adjustable to cut into portion logs of different diameter, according to the production needs. Each clamping device, therefore, must be equipped with means for clamping the log with interchangeable or adjustable clamping surfaces, for adapting itself in turn to a range of different diameters.

A first type of known clamping device provides the replacement of the elements for clamping the log, further to a stop of the machine. This type of machine, however, requires long stops, since the elements of the clamping device must first be disassembled after removal of their driving apparatus, then must be replaced with other elements of different size, and finally assembled again along with their driving apparatus for starting again the machine.

A second type of cut off machines provides a holding device with flexible surfaces, which however are of composite and expensive structure.

Concerning the systems for driving the saw, the cut off step is carried out by means of a quickly rotating belt saw or circular saw, whose support has an oscillating movement which can be reciprocating, rotating along a circle or along a more complex orbit.

Means are provided for synchronising the stepped movement of the log and the moment in which the saw is at the top dead center between two consecutive cuts. In particular, most of machines are equipped with means for pushing the logs and means for rocking the saw support with independent motors, synchronised by programmable means.

However, the known systems above described used to cut off a log of paper into rolls of desired size have some drawbacks. In particular, when cutting off rolls from logs of large diameter a high friction occurs between the blade and the log. This speeds up the wear of the blade and unavoidably affects its cutting efficiency. Furthermore, the cut carried out by the blade in presence of high stresses on the log is not orthogonal to the log's longitudinal axis and this inclination anaesthetically affects the final product.

In order to solve this drawback various attempts have been made. For example, in EP 555190 a helical blade has been proposed having adjustable radius, so that the difference between the maximum radius and the minimum radius is at least the same as the maximum diameter of the log to cut. Furthermore, in order to provide a cut perpendicular to the log the axis of rotation of the blade is arranged slightly inclined with respect to the conveying direction of the log. This solution, however, is structurally complicated and owing to unbalanced loads on the blade during the cut a not uniform wear on the same occurs.

SUMMARY OF THE INVENTION

It is a feature of the present invention to provide a transversal cutting machine wherein the log is cut with the aid of a clamping device capable of making easier the action of the blade for cutting off rolls of desired size.

It is another feature of the present invention to provide a transversal cutting machine wherein the logs are cut off by the blade aided by a clamping device that reduces the friction between the blade and the log thus reducing the wear caused by the cutting step.

This and other features are accomplished with one exemplary transversal cutting machine of a log of paper having a longitudinal axis, said log being conveyed towards a cutting zone where a part thereof is blocked by clamping device so that a blade is driven in the paper cutting in turn the log into rolls or packs, wherein said clamping device comprise a first and a second part respectively upstream from and downstream of the blade, whose main feature is that the clamping device move during the cut so that the blade driven in the log encounters a minimum resistance.

In particular, when cutting the log the first and the second part of the clamping device move relatively to each other.

Advantageously, the relative movement between the first and the second part of the clamping device produce a flexional action on the log suitable for creating an opening having a size at least the same as the thickness of the blade.

In particular, the first and the second part of the clamping device during the cut of the log move relatively away from each other progressively along a direction substantially parallel to the longitudinal axis of the log.

Advantageously, the relative movement of the first and of the second part of the clamping device is a combination of the above described movements.

Alternatively, the first and the second part of the clamping device during the cut of the log have a relative rotational movement.

In a possible exemplary embodiment, each part of the clamping device comprises a clamping element and a support element that in use are arranged at opposite sides with respect to the log. In this case, the relative movement of the first and of the second part of the clamping device a reciprocation between each clamping element and the respective support element.

Advantageously, the relative movement of the first and of the second part of the clamping device is made through actuating means, for example of pneumatic, hydraulic type, etc.

Alternatively, the relative movement of the first and of the second part of the clamping device is directly induced by the cutting action of the blade on the log. In this case, the relative movement of the first and of the second part of the clamping device can be biased by resilient means having controlled resiliency. This the cutting slit progressively opens as the of the cutting action of the blade proceeds.

For example, the first and the second part of the clamping device are mounted on a carriage sliding on a guide oriented along the above described direction substantially parallel to the longitudinal axis of the log.

Advantageously, if the blade is driven in log moving along a direction substantially orthogonal to the longitudinal axis of the log same, i.e. with a "guillotine type" movement, the opening on the log is made by the relative movement of the first and of the second part of the clamping device in a plane substantially orthogonal to the direction along which the blade moves.

In an exemplary embodiment of the invention, the first and the second part of the clamping device can in turn being split into two further portions. In this case, the two inner portions, i.e. the downstream portion of the first part and the upstream portion of the second part, can move, during the cut, with respect to the two outer portions, i.e. the upstream portion of the first part and the downstream portion of the second part, respectively.

In particular, the inner portions can raise with respect to the two outer portions.

Alternatively, the inner portions can rotate with respect to the two outer portions.

Advantageously, the inner portions comprise a clamping element and a support element that in use are arranged respectively above and under the log. More in detail, before cutting a roll or pack the clamping element remains raised and during the cut the support element moves up, whereas during the cut of a scrap the clamping element remains lowered on the support element.

BRIEF DESCRIPTION OF THE DRAWINGS

Further characteristics and/or advantages of the transversal cutting machine and of the clamping device according to the present invention will be made clearer with the following description of an exemplary embodiment thereof, exemplifying but not limitative, with reference to the attached drawings wherein.

Figure 1:
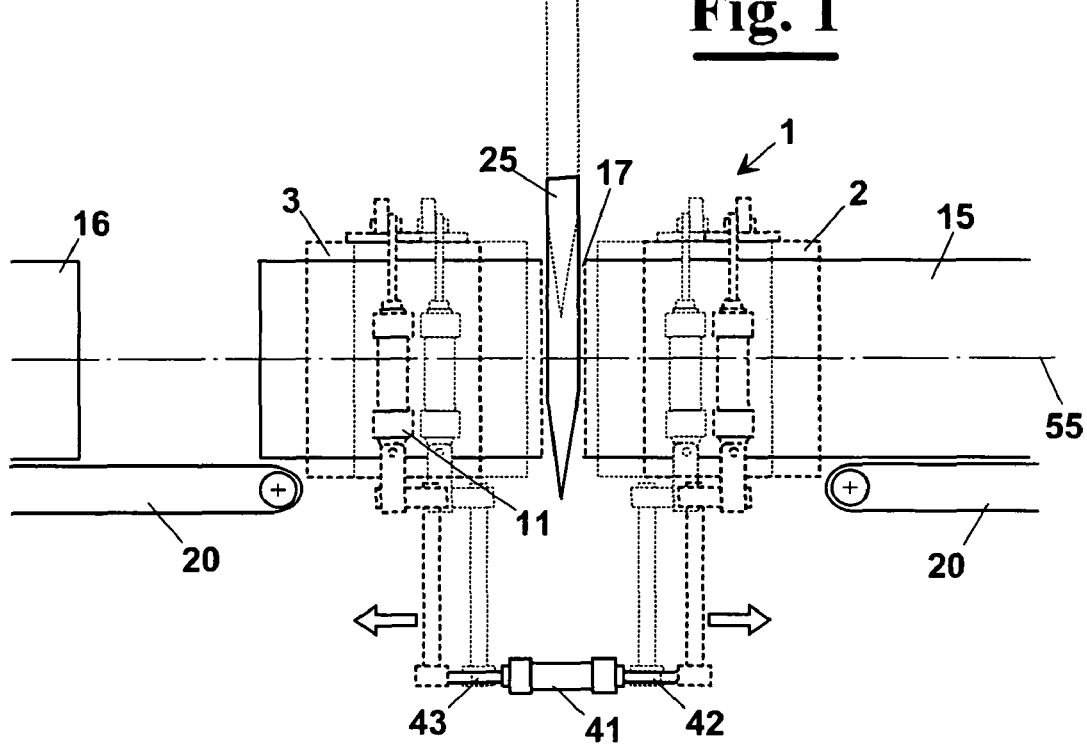
FIG. 1 shows in an elevational side view a first exemplary embodiment of a transversal cutting machine, according to the present invention.
Figure 6:
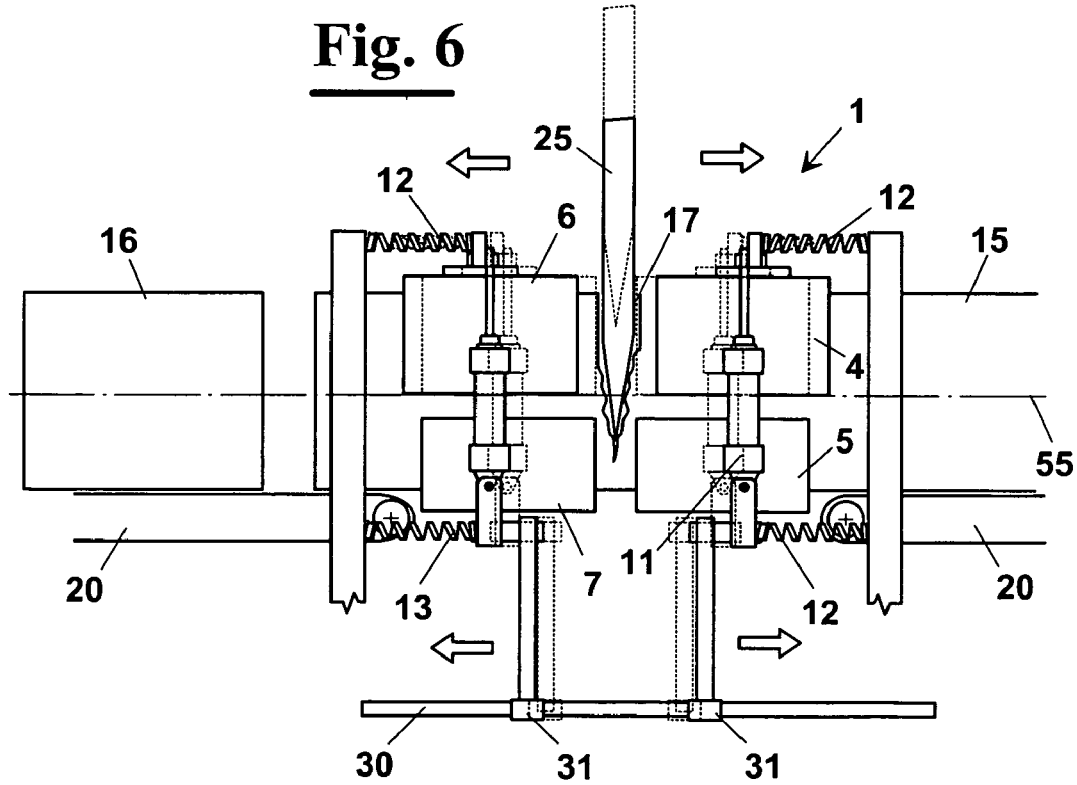

Figures from 3 to 5 show an elevational side view of some phases of the cutting step carried out with a further exemplary embodiment of the transversal cutting machine according to the present invention;

FIGS. 6 and 7 show an elevational side view of a still further exemplary embodiment of the machine of FIG. 1;

Figures from 8 to 10 show in an elevational side view further exemplary embodiments of the machine of FIG. 1.

DESCRIPTION OF A PREFERRED EXEMPLARY EMBODIMENT

With reference to FIG. 1, a transversal cutting machine according to the present invention comprises feeding means 20 that supplies a log of paper 15, for example hygienic paper, to a sawing station at which rolls or stacks 16 are cut off from log 15 by a blade 25. During the cutting step log 15 is held by a clamping device 1, divided in two parts diagrammatically shown as blocks 2 and 3 arranged respectively upstream from and downstream of a slit 17 through which blade 25 passes. In particular, the first part 2 and the second part 3 of clamping device 1 are movable relatively so that during the cut log 15 is locally subject to traction at the same time of blade 25 driven in the log. This way, during the cutting action of blade 25 an opening 17 is created on log 15 having a size at least the same as the thickness of blade 25 same. This makes easier the action of blade 25 since it reduces the friction produced between blade 25 and log 15.

The relative movement between two parts 2 and 3 of clamping device 1 can be a motion along a direction substantially parallel to the longitudinal axis 55 of log 15 (figures from 1 to 7).

In figures from 3 to 5 a succession is diagrammatically shown of steps through which log 15 is opened by clamping device 1 simultaneously to the action of blade 25. In this case, clamping device 1 provides a support base 5, or 7, and a clamping element 4, or 6, which are operated for example by an actuator 11 and are movable between a position where log 15 is loose and a position where log 15 is pressed on the base for allowing blade 25 to cut. Furthermore, support base 5, or 7, and the respective clamping element 4, or 6, can move integrally along a direction that increases opening 17 on log 15, or, alternatively, it can move independently (FIGS. 6 and 7).

Figure 2:
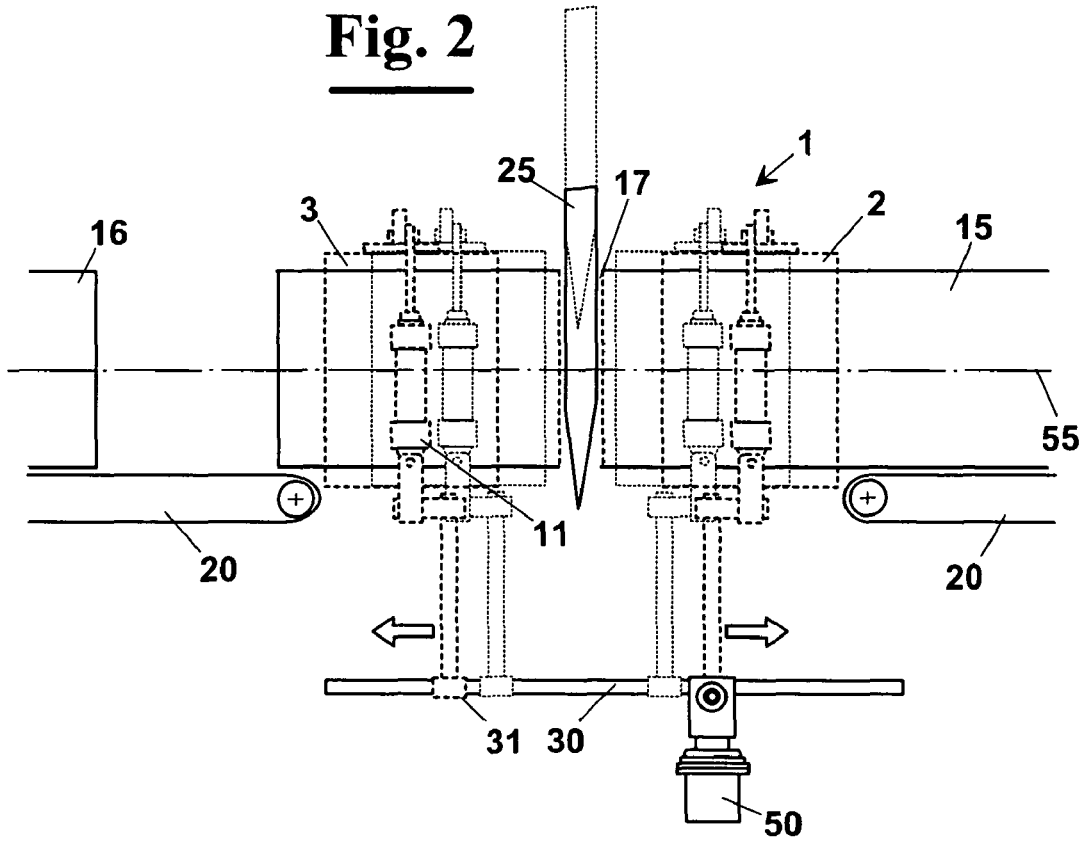
FIG. 2 shows in an elevational side view an exemplary embodiment of a transversal cutting machine alternative to that of FIG. 1.
Figure 3:
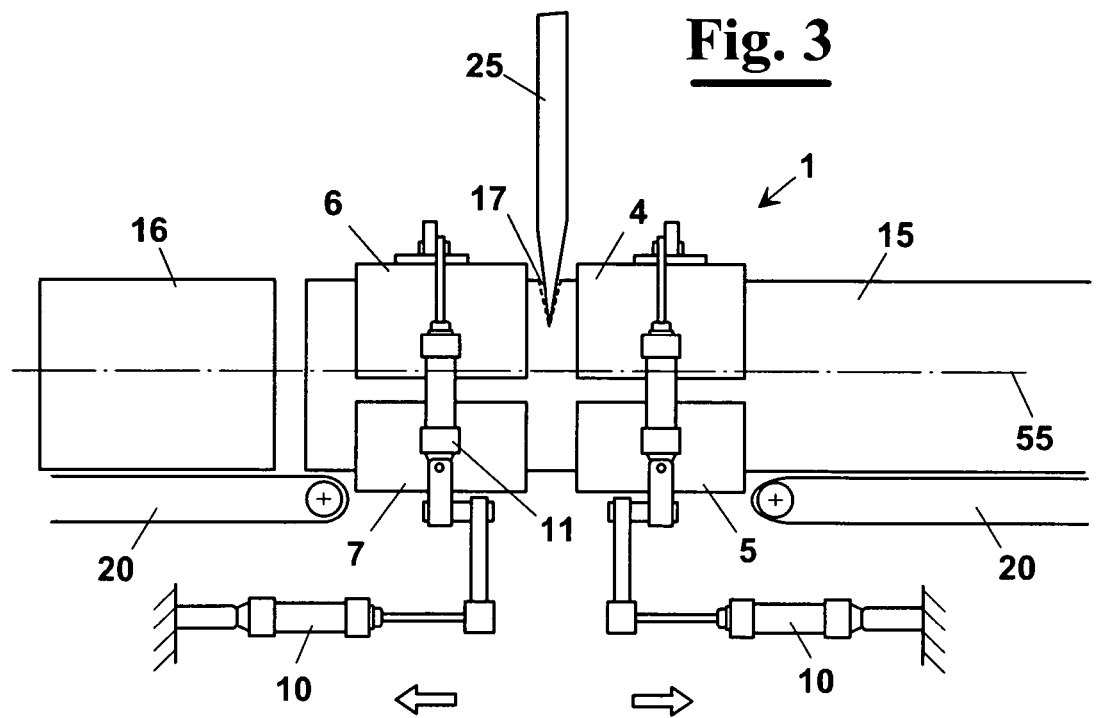
Figure 4:
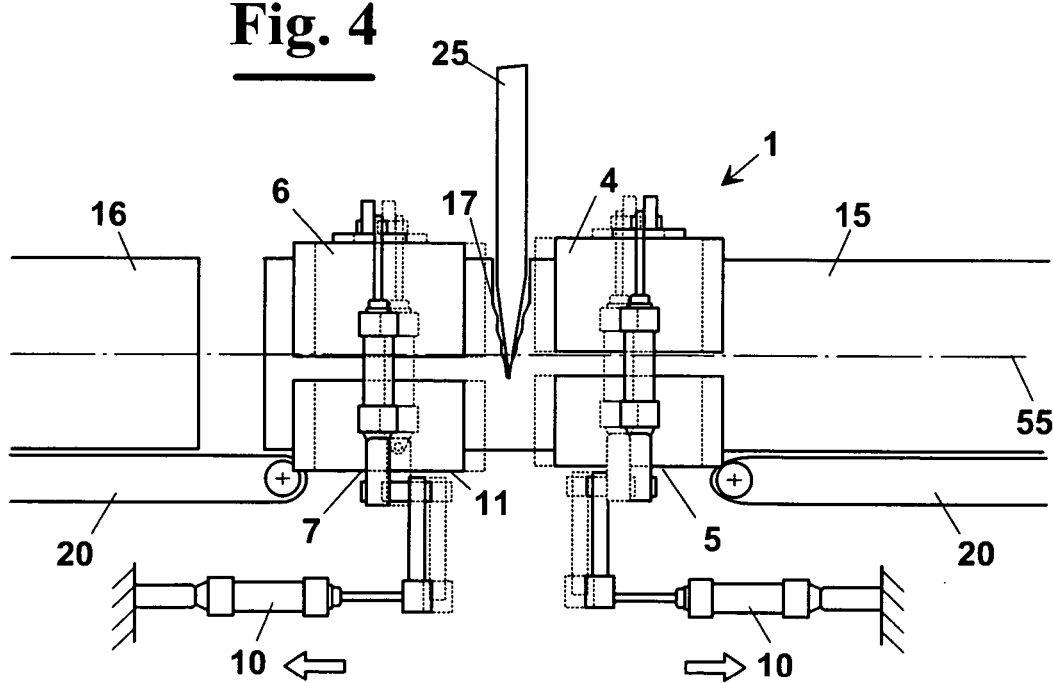
Figure 5:
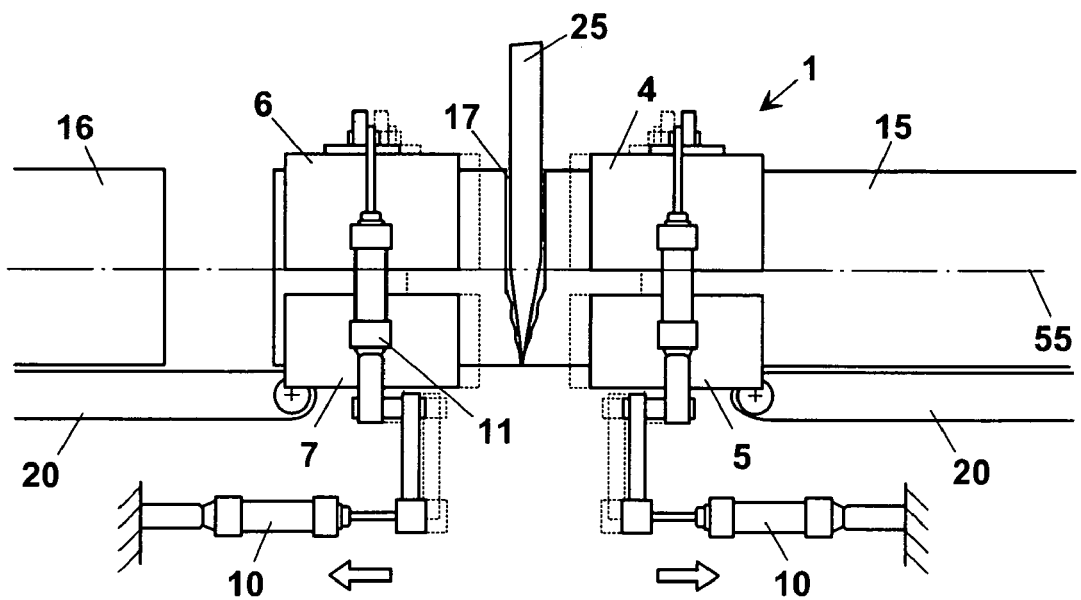

Each part 2 and 3 of clamping device 1 can be moved as shown in FIG. 1 by a single actuator 41 having two stems 42 and 43, for example of pneumatic or hydraulic type, arranged between parts 2 and 3 same. In another exemplary embodiment the relative movement is a progressive motion of two parts 2 and 3 caused by two independent actuators 10 (figures from 3 to 5). In a further exemplary embodiment each part 2 and 3 can be mounted on a carriage 31 that is operated by a motor 50 and slides along a guide 30 (FIG. 2) for causing the two parts 2 and 3 to move away from each other along a direction substantially parallel to the longitudinal axis 55 of log 15.

According to another exemplary embodiment, each part 2 and 3 of clamping device 1 has a certain freedom of movement so that the cutting action of blade 25 pulls them away from each other. For example, parts 2 and 3 of clamping device 1 can be mounted on carriages 30 that move sliding on a guide 31 biased by resilient elements 12. In the case shown in FIGS. 6 and 7, furthermore, the motion of base 5 and 7 is independent from the motion of the respective clamping element 4 and 6 that allows the opening of log 15.

In a further exemplary embodiment of the invention, shown in FIG. 8, the opening 17 of log 15 is created inducing a rotation of parts 2 and 3 in opposite directions. This rotation, which occurs for example about a centre of rotation 22, in respective opposite directions for two parts 2 and 3, produces a flexional stress on log 15 and a subsequent action of local traction when blade 25 is driven in log 15 (FIG. 6). Furthermore, the rotation can affect both base 5 and 7 and the relative clamping element 4 and 6 of each part 2 and 3 of clamping device 1, as in the case of FIGS. 6 and 7, or alternatively, is limited only to the clamping element 4 or 6.

What above described with reference to this exemplary embodiment is in any case to be considered correspondingly valid in case of clamping devices of machines transversal cutting machines made in other ways. For example, a clamping device as described in IT 1284116 comprises a gripping unit that clamps the log approaching laterally with respect to it.

In FIG. 9 a further exemplary embodiment is diagrammatically shown of clamping device 1 for a transversal cutting machine. In this case, each part 2 and 3 of clamping device 1 are divided in turn in two portions 2a and 2b, and 3a and 3b respectively. The two inner portions, i.e. parts 2a and 3a, are capable of moving during the cut, with respect to the two outer portions 2b and 3b in order to bend log 15 and to aid the cutting action of blade 25. To this end, as shown in FIG. 9, the inner portions 2a and 3a can raise, for example operated by actuators 11a, with respect to the outer portions 2b and 3b.

Alternatively, in an exemplary embodiment not shown in the figures, the inner portions 2a and 3a can rotate with respect to the outer portions 2b and 3b.

In a further exemplary embodiment shown in FIG. 10, a "saddle" 26, having a form suitable to not interfere with the cutting action of blade 25, raises log 15. Saddle 26 can be operated in the direction of blade 25 for example by an actuator 35.

Obviously, further combinations are possible of motion of the clamping elements to obtain the desired effect of opening the slit where the blade is driven in the log. For example, it is possible that the upstream clamping unit remains still and that only the downstream element rotates and translates. Or, only one of the clamping elements moves with respect to a fixed reference, for example only the downstream clamping element.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A method for transversally cutting a log of tissue paper for making rolls of tissue paper, said log of tissue paper having a longitudinal axis, said method comprising the steps of:
   providing a sawing station comprising a blade;
   feeding said log of tissue paper towards a cutting zone of said sawing station;
   blocking a part of said log of tissue paper using a clamping device; said clamping device comprising a first part upstream from said blade, and a second part downstream from said blade;
   driving said blade into the paper and cutting in turn the log of tissue paper into rolls;
   wherein said step of blocking provides blocking by said first part of the clamping device said log of tissue paper and blocking by said second part of the clamping device a roll being cut, and wherein said step of cutting provides cutting the log of tissue paper by penetration of a triangular cutting edge of the blade; and
   during the cut, when clamping the log of tissue paper by said first part and clamping said roll being cut by said second part, moving said first and second parts relative to each other such that said blade driven in the log of tissue paper forms a cutting slit that progressively opens as the cutting action of the blade proceeds causing a minimum friction of the blade with and wherein said relative movement of said first and second parts of said clamping device produce a flexional action on said log of tissue paper suitable for creating an opening having a size substantially equal to the thickness of said blade.

2. The method according to claim 1, wherein said cutting slit is caused to progressively open due to a progressive relative motion of said first and second parts.

3. The method according to claim 2, wherein said first and second parts of said clamping device during the cut of said log of tissue paper move relatively away from each other progressively along a direction substantially parallel to the longitudinal axis of said log.

4. The method according to claim 1, wherein said relative movement of said first and second parts of said clamping device is a combination of:
   a flexional action on said log of tissue paper suitable for creating an opening having a size substantially equal to the thickness of said blade; and
   the relative moving away of said first and second parts of said clamping device away from each other progressively along a direction substantially parallel to the longitudinal axis of said log.

5. The method according to claim 1, wherein said first and second parts of said clamping device during the cut of said log of tissue paper have a rotational movement relative to each other.

6. The method according to claim 2, wherein said clamping device comprises a clamping element and a support element, and wherein said clamping element and support element are arranged at opposite sides with respect to said log, said relative movement of said first and second parts of said clamping device being obtained by a reciprocation between each clamping element and the respective support element made through actuating means.

7. The method according to claim 2, wherein said relative motion of said first and second parts of said clamping device is directly caused by the cutting action of said blade on said log.

8. The method according to claim 2, wherein said relative motion of said first and second parts of said clamping device is biased by resilient means having controlled resiliency.

9. The method according to claim 2, wherein said first and second parts of said clamping device are mounted on a carriage, and wherein said carriage slides on a guide oriented along said direction substantially parallel to said longitudinal axis of said log.

10. The method according to claim 2, wherein wherein said blade is driven in said log of tissue paper moving along a direction substantially orthogonal to said longitudinal axis of said log, said opening being created by said relative movement of said first and second parts of said clamping device in a plane substantially orthogonal to the direction along which said blade moves.

11. The method according to claim 1, wherein said first and second parts are in turn split into two portions, during the cut the two inner portions, at the downstream portion of the first part and the upstream portion from said second part, moving with respect to the two outer portions, and at the upstream portion of the first part and the downstream portion said second part, respectively.

12. The method according to claim 11, wherein said inner portions translate with respect to the two outer portions.

13. The method according to claim 11, wherein said inner portions rotate with respect to the two outer portions.

14. The method according to claim 11, wherein said inner portions comprise a clamping element and a support element that in use are arranged respectively above and under said log, before cutting a roll the clamping element remaining raised and during the cut the support element moving up, whereas during the cut of a scrap the clamping element remains lowered on the support element.

* * * * *